United States Patent
Ichimura et al.

(10) Patent No.: US 8,106,717 B2
(45) Date of Patent: Jan. 31, 2012

(54) QUANTUM GATE METHOD AND APPARATUS

(75) Inventors: Kouichi Ichimura, Yokohama (JP); Hayato Goto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 210 days.

(21) Appl. No.: 12/561,532

(22) Filed: Sep. 17, 2009

(65) Prior Publication Data
US 2010/0088488 A1    Apr. 8, 2010

(30) Foreign Application Priority Data
Sep. 17, 2008 (JP) .................. 2008-238381

(51) Int. Cl.
H01S 1/00 (2006.01)
H03L 7/26 (2006.01)

(52) U.S. Cl. ............... 331/94.1; 372/2; 372/70; 977/933

(58) Field of Classification Search ............ 331/3, 94.1; 372/2, 23, 69, 70; 356/437; 250/493.1, 494.1, 250/495.1; 359/107, 108, 896; 712/1, 220; 977/932, 933
See application file for complete search history.

(56) References Cited

U.S. PATENT DOCUMENTS
6,800,837 B1 * 10/2004 Ichimura et al. ......... 250/214 R
2006/0043357 A1 * 3/2006 Ichimura et al. ............ 257/14

OTHER PUBLICATIONS

Kouichi Ichimura, "A simple frequency-domain quantum computer with ions in a crystal coupled to a cavity mode", Optics Communications, vol. 196, Sep. 1, 2001, pp. 119-125.
Hayato Goto, et al., "Multiqubit controlled unitary gate by adabatic passage with an optical cavity", Physical Review A, vol. 70, 2004, pp. 012305-1 to 012305-8.
L.-M. Duan, et al., "Robust quantum gates on neutral atoms with cavity-assisted photon scattering", Physical Review A, vol. 72, 2005, pp. 032333-1 to 032333-4.

* cited by examiner

Primary Examiner — Levi Gannon
(74) Attorney, Agent, or Firm — Oblon, Spivak, McClelland, Maier & Neustadt, L.L.P.

(57) ABSTRACT

A method includes causing a common-resonator mode resonating with a transition between $|2\rangle_i$ and $|3\rangle_i$ that are coupled to each other by a transition having a homogenous broadening $\Delta E_{homo}$ greater than an energy difference between $|0\rangle_i$ and $|1\rangle_i$, an energy difference between $|2\rangle_i$ and $|3\rangle_i$ being greater than $\Delta E_{homo}$, transferring states of m quantum bits represented by $|0\rangle_k$ and $|1\rangle_k$ to $|4\rangle_k$ and $|5\rangle_k$, respectively, when a quantum-bit-gate operation using the common-resonator mode is executed between the quantum bits represented by m physical systems k, $|E(|u\rangle_k) - E(|v\rangle_k)| > \Delta E_{homo}$, u, v ∈ {2, 3, 4, 5}, u≠v, executing adiabatic passage between the physical systems k, using light that resonates with a transition between $|3\rangle_k$ and $|4\rangle_k$ and a transition between $|3\rangle_k$ and $|5\rangle_k$, executing the quantum-bit-gate operation between the quantum bits, and transferring, to $|0\rangle_k$ and $|1\rangle_k$, the states represented by $|4\rangle_k$ and $|5\rangle_k$, respectively.

15 Claims, 7 Drawing Sheets

QUANTUM GATE METHOD AND APPARATUS

CROSS-REFERENCE TO RELATED APPLICATIONS

This application is based upon and claims the benefit of priority from prior Japanese Patent Application No. 2008-238381, filed Sep. 17, 2008, the entire contents of which are incorporated herein by reference.

BACKGROUND OF THE INVENTION

1. Field of the Invention

The present invention relates to a quantum gate method and apparatus for executing a quantum gate operation using a resonator mode.

2. Description of the Related Art

The state of the nuclear spin of each rare-earth ion in crystal has a coherence time specifically long as a solid (it is approx. 500 μs at 4 K, 80 ms when a magnetic field is applied, and 30 s when an rf pulse sequence is applied), can be controlled and read by applying light thereto, and is therefore extremely suitable for realizing a solid quantum information processing device. A frequency-domain quantum computer has been proposed, in which a resonator mode is used to couple quantum bits formed of states of nuclear spins in crystal, thereby increasing the number of usable quantum bits (see, for example, Opt. Commun. 196, 119 (2001)). In the conventional technique, however, it is difficult to set a coupling constant g to a value sufficient for a 2-qubit gate (or multi-qubit gate) between quantum bits, since use of an f-f transition having a very small oscillator strength is presupposed for coupling with the resonator mode.

The reason why the use of the f-f transition is considered is that it satisfies the following two conditions, presupposing that a quantum bit is represented by the state of the nuclear spin of an ion in the electron ground state, which state has a long coherence time: (1) To discriminate the states of a single ion (such as |0> and |1> representing the basis states of the quantum bit) using optical transition energy, the employed homogenous broadening for an optical transition must be not more than the split width (10 to 100 MHz) due to the nuclear spin of the ion; and (2) since quantum bits are discriminated using optical transition energy, the employed homogenous broadening for the optical transition must be not more than the difference between energy levels used for discriminating the quantum bits (when quantum bits are discriminated using an inhomogenous distribution of a hyperfine structure, the homogenous broadening must be not more than approx. several kHz, and when the discrimination is executed using an inhomogenous broadening for an optical transition, the homogenous broadening must be not more than approx. several GHz).

If an f-d transition inherently allowable can be used instead of an f-f transition only a little allowable in the field of crystal, this is much more advantageous in view of the coupling constant (approx. 1000 times advantageous). However, the f-d transition has a great homogenous broadening (approx. 30 THz or less), and any method for satisfying the above-mentioned conditions (1) and (2) while using the f-d transition is not yet known.

BRIEF SUMMARY OF THE INVENTION

In accordance with a first aspect of the invention, there is provided a quantum gate method comprising: causing a common resonator mode to resonate with a first transition between states of $|2>_i$ and $|3>_i$ in regard to physical systems i ($1 \leq i \leq n$, n: integer not less than 2), the states of $|2>_i$ and $|3>_i$ being coupled to each other by a second transition having a homogenous broadening of $\Delta E_{homo}$ greater than an energy difference between two states of $|0>_i$ and $|1>_i$, an energy difference between the states of $|2>_i$ and $|3>_i$ being greater than the homogenous broadening of $\Delta E_{homo}$, a plurality of physical systems contained in a resonator being set as the physical systems i, quantum bits being represented by the two states of $|0>_i$ and $|1>_i$ of each of the physical systems i; transferring states of m ($2 \leq m \leq n$) quantum bits represented by states of $|0>_k$ and $|1>_k$ to states of $|4>_k$ and $|5>_k$, respectively, when a quantum bit gate operation using the common resonator mode is executed between the quantum bits represented by m physical systems k (k=j(1), j(2), ..., j(m)) included in the physical systems i, the states of $|4>_k$ and $|5>_k$ being two states of each of the physical systems k, an energy difference between the states of $|4>_k$ and $|5>_k$ being greater than the homogenous broadening of $\Delta E_{homo}$, an energy difference between any one of the two states of $|4>_k$ and $|5>_k$ and any one of states of $|2>_k$ and $|3>_k$ being greater than the homogenous broadening $\Delta E_{homo}$ ($|E(|u>_k)-E(|v>_k)| > \Delta E_{homo}$, u, v∈{2, 3, 4, 5}, u≠v, E(|s>) representing energy of a state s); executing adiabatic passage between the physical systems k, using light that resonates with a third transition between states of $|3>_k$ and $|4>_k$ and a fourth transition between states of $|3>_k$ and $|5>_k$; executing, between the quantum bits, a quantum bit gate operation using the common resonator mode; and transferring, to the states of $|0>_k$ and $|1>_k$, the states of quantum bits represented by the states of $|4>_k$ and $|5>_k$, respectively.

In accordance with a second aspect of the invention, there is provided a quantum gate method comprising: causing a common resonator mode to resonate with a first transition between states of $|2>_i$ and $|3>_i$ in regard to physical systems i ($1 \leq i \leq n$, n: integer not less than 2), the states of $|2>_i$ and $|3>_i$ being coupled to each other by a second transition having a homogenous broadening of $\Delta E_{homo}$ greater than an energy difference between two states of $|0>_i$ and $|1>_i$, an energy difference between the states of $|2>_i$ and $|3>_i$ being greater than the homogenous broadening of $\Delta E_{homo}$, a plurality of physical systems contained in a resonator being set as the physical systems i, quantum bits being represented by the two states of $|0>_i$ and $|1>_i$ of each of the physical systems i; transferring states of m ($2 \leq m \leq n$) quantum bits represented by states of $|0>_k$ and $|1>_k$ to states of $|4>_k$ and $|5>_k$, respectively, when a quantum bit gate operation using the common resonator mode is executed between the quantum bits represented by m physical systems k (k=j(1), j(2), ..., j(m)) included in the physical systems i, the states of $|4>_k$ and $|5>_k$ being two states of each of the physical systems k, an energy difference between the states of $|4>_k$ and $|5>_k$ being greater than the homogenous broadening of $\Delta E_{homo}$, an energy difference between any one of the two states of $|4>_k$ and $|5>_k$ and any one of states of $|2>_k$ and $|3>_k$ being greater than the homogenous broadening $\Delta E_{homo}$, an energy difference between two states $|u>_q$ and $|v>_r$ of different ones of the physical systems k being greater than the homogenous broadening of $\Delta E_{homo}$ ($|E(|u>_q)-E(|v>_r)| > \Delta E_{homo}$, u, v∈{4, 5}, q, r∈{j(1), j(2), ... j(m)}, q≠r); executing adiabatic passage between the physical systems k, using light that resonates with a third transition between states of $|3>_k$ and $|4>_k$ and a fourth transition between states of $|3>_k$ and $|5>_k$; executing, between the quantum bits, a quantum bit gate operation using the common resonator mode; and transferring, to the states of $|0\rangle_k$ and $|1\rangle_k$, the states of quantum bits represented by the states of $|4\rangle_k$ and $|5\rangle_k$, respectively.

In accordance with a third aspect of the invention, there is provided a quantum gate method comprising: causing a common resonator mode to resonate with a first transition between states of $|2\rangle_i$ and $|3\rangle_i$ in regard to physical systems i ($1 \leq i \leq n$, n: integer not less than 2), the states of $|2\rangle_i$ and $|3\rangle_i$ being coupled to each other by a second transition having a homogenous broadening of $\Delta E_{homo}$ greater than an energy difference between two states of $|0\rangle_i$ and $|1\rangle_i$, an energy difference between the states of $|2\rangle_i$ and $|3\rangle_i$ being greater than the homogenous broadening of $\Delta E_{homo}$, a plurality of physical systems contained in a resonator being set as the physical systems i, quantum bits being represented by the two states of $|0\rangle_i$ and $|1\rangle_i$ of each of the physical systems i; transferring, to a state of $|2\rangle_k$, one of states of $|0\rangle_k$ and $|1\rangle_k$ when a quantum bit gate operation using the common resonator mode is executed between m ($2 \leq m \leq n$) quantum bits represented by m physical systems k (k=j(1), j(2), . . . , j(m)) included in the physical systems i, an energy difference between the state of $|2\rangle_k$ and the one of the states of $|0\rangle_k$ and $|1\rangle_k$ being not greater than the homogenous broadening of $\Delta E_{homo}$, an energy difference between the state of $|2\rangle_k$ and the other of the states of $|0\rangle_k$ and $|1\rangle_k$ being greater than the homogenous broadening of $\Delta E_{homo}$, the other state of $|0\rangle_k$ and $|1\rangle_k$ being kept unchanged, the state of $|2\rangle_k$ and a state of $|3\rangle_k$ being coupled with each other by the first transition, the state of $|2\rangle_k$ being lower in energy than the state of $|3\rangle_k$; applying, to the resonator, a single photon that resonates with the common resonator mode to execute the quantum bit gate operation between the quantum bits; and returning the state of $|2\rangle_k$ to the one of the states of $|0\rangle_k$ and $|1\rangle_k$ after finishing the quantum bit gate operation executed between the quantum bits using the single photon and the common resonator mode.

DETAILED DESCRIPTION OF THE INVENTION

A quantum gate method and apparatus according to an embodiment of the present invention will be described in detail with reference to the accompanying drawings. In the embodiment and examples described below, like reference numbers denote like elements, and duplication of explanations is omitted.

In the quantum gate method and apparatus of the embodiment, strong coupling of a resonator mode with a transition of a great transition dipole moment and homogenous broadening can be utilized for a quantum gate operation.

Figure 1:
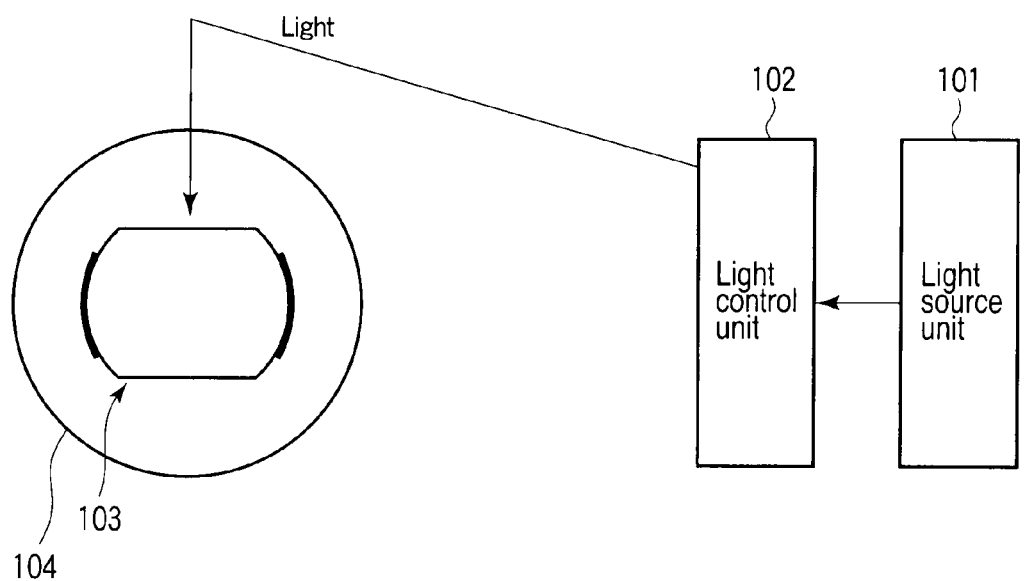
FIG. 1 is a block diagram illustrating a quantum gate apparatus according to an embodiment.

Referring first to FIG. 1, the quantum gate apparatus of the embodiment will be described.

The quantum gate apparatus of the embodiment comprises a light source unit 101, a light control unit 102, resonator-attached crystal 103 and a cryostat 104.

The light source unit 101 generates a plurality of (e.g. nine) laser beams and narrows the spectral width of each laser beam.

The optical control unit 102 uses an optic effect element to set the frequency and intensity of each laser beam.

The resonator-attached crystal 103 includes crystal (e.g., oxide crystal containing rare-earth ions) and resonates with light having a preset resonance frequency.

The cryostat 104 sets the internal temperature at a low temperature (e.g. 1.5 K), and contains the resonator-attached crystal 103.

The specific operations of these elements will be described later in the embodiment.

A description will now be given of a mechanism, employed in the embodiment, for realizing a quantum gate operation by discriminating the states indicating a quantum bit or quantum bits, using strong coupling of a transition having a great homogenous broadening and a resonator mode, the states normally having an energy difference therebetween and having long coherence times. A description will also be given of a mechanism for increasing the strength of coupling of a physical system representing a quantum bit with the resonator mode, thereby enhancing the performance of the quantum gate (reducing the failure probability of the quantum gate).

Figure 2:
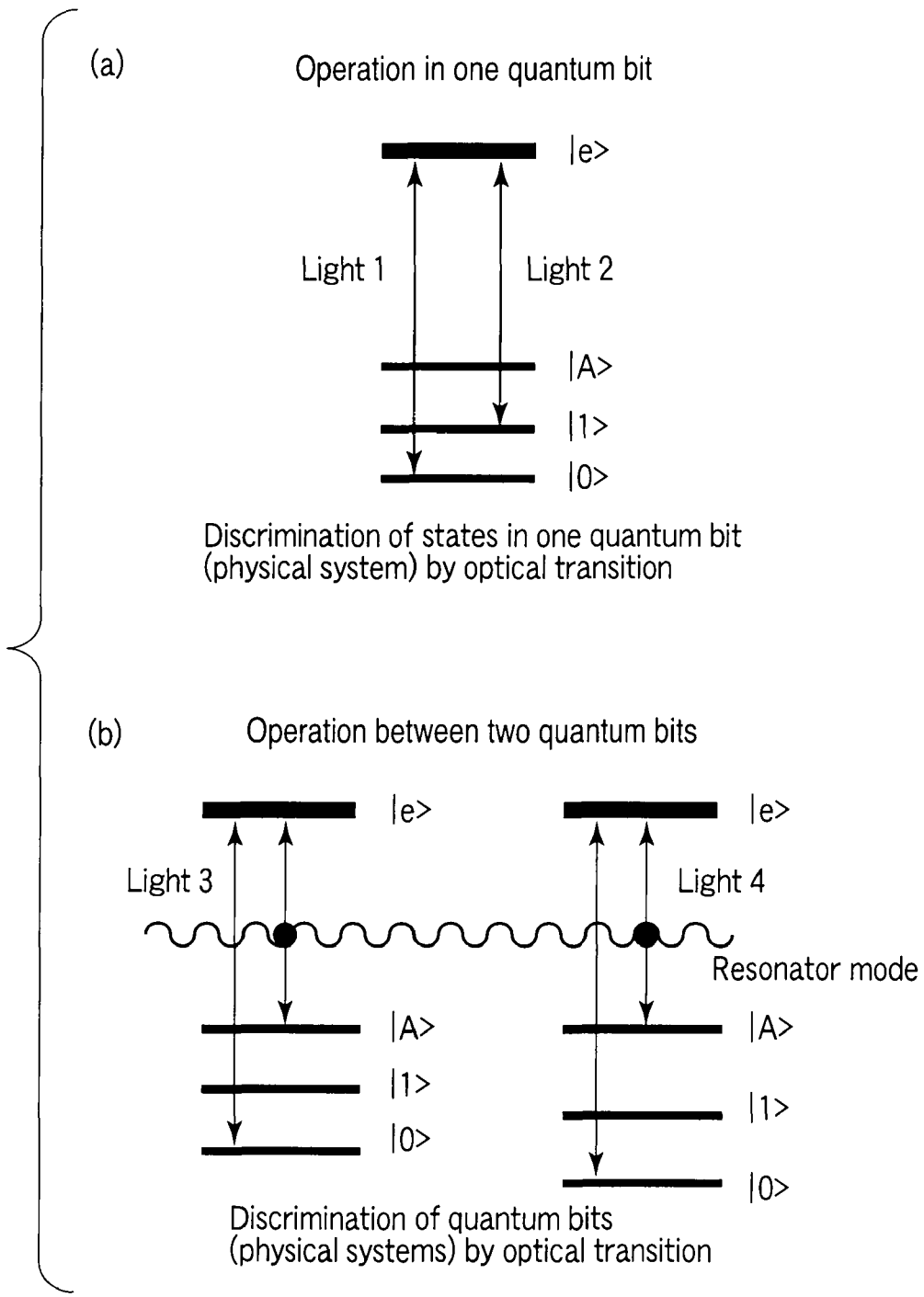
FIG. 2 is a view useful in explaining state discrimination and quantum bit discrimination using energy in a quantum gate using light.

Referring then to FIG. 2, a quantum gate realized when a quantum bit is represented by two states of a small energy difference, and light is used to operate the quantum bit will be described. This case corresponds to, for example, a case where the states of the nuclear spin of a rare-earth ion in oxide crystal, obtained by hyperfine structure splitting, are used as a quantum bit.

In the quantum gate operation, there is a case where the quantum state of a single quantum bit is operated. In this case, it is necessary to discriminate a plurality of quantum states representing a quantum bit (e.g., the ground states of a quantum bit) during their operations. FIG. 2(a) shows a state in which light beams 1 and 2, which resonate with a $|0\rangle$–$|e\rangle$ transition and a $|1\rangle$–$|e\rangle$ transition, respectively ($|0\rangle$ and $|1\rangle$ representing the quantum bit), are applied to the quantum bit to operate the same. When operating the quantum bit, the light beams 1 and 2 are each subjected to control of, for example, temporal changes of light intensity. Accordingly, it is desirable that the light beams 1 and 2 only resonate with the $|0\rangle$–$|e\rangle$ transition and $|1\rangle$–$|e\rangle$ transition, respectively. To this end, the homogeneous broadenings of the $|0\rangle$–$|e\rangle$ transition and $|1\rangle$–$|e\rangle$ transition must be smaller than the difference in energy between the states $|0\rangle$ and $|1\rangle$.

Further, for realizing the quantum gate, operations between two quantum bits are needed. To discriminate and operate the quantum bits based on the difference in transition frequency between them, it is necessary to set the homogeneous broadening for the transition used for the operation, narrower than the difference in transition frequency between the quantum bits. FIG. 2(b) is a view useful in explaining this. The $|A\rangle$–$|e\rangle$ transition of each of physical systems 1 and 2 resonates with a common resonator mode, which enables two quantum bits to be operated. To operate the two quantum bits by resonating, after executing some preset operations, light beams 3 and 4 with the $|0\rangle$–$|e\rangle$ transition of the physical systems 1 and 2, respectively, it is necessary to set the homogeneous broadening of the $|0\rangle$–$|e\rangle$ transition smaller than the difference in transition frequency between the physical systems 1 and 2.

Further, to resonate, only with the |A>–|e> transition, two quantum bits coupled with the resonator mode for the gate operation between the two quantum bits, it is necessary to set the homogeneous broadening of the |A>–|e> transition smaller than the difference in energy between the states |0> and |A> and also than the difference in energy between the states |1> and |A>.

As described above, to operate each quantum bit by discriminating, using differences in energy, states in each quantum bit or states representing different quantum bits, it is necessary to set a homogenous broadening for the transition used for the operation, smaller than the energy difference between states that normally or temporarily represent each quantum bit.

Figure 3:
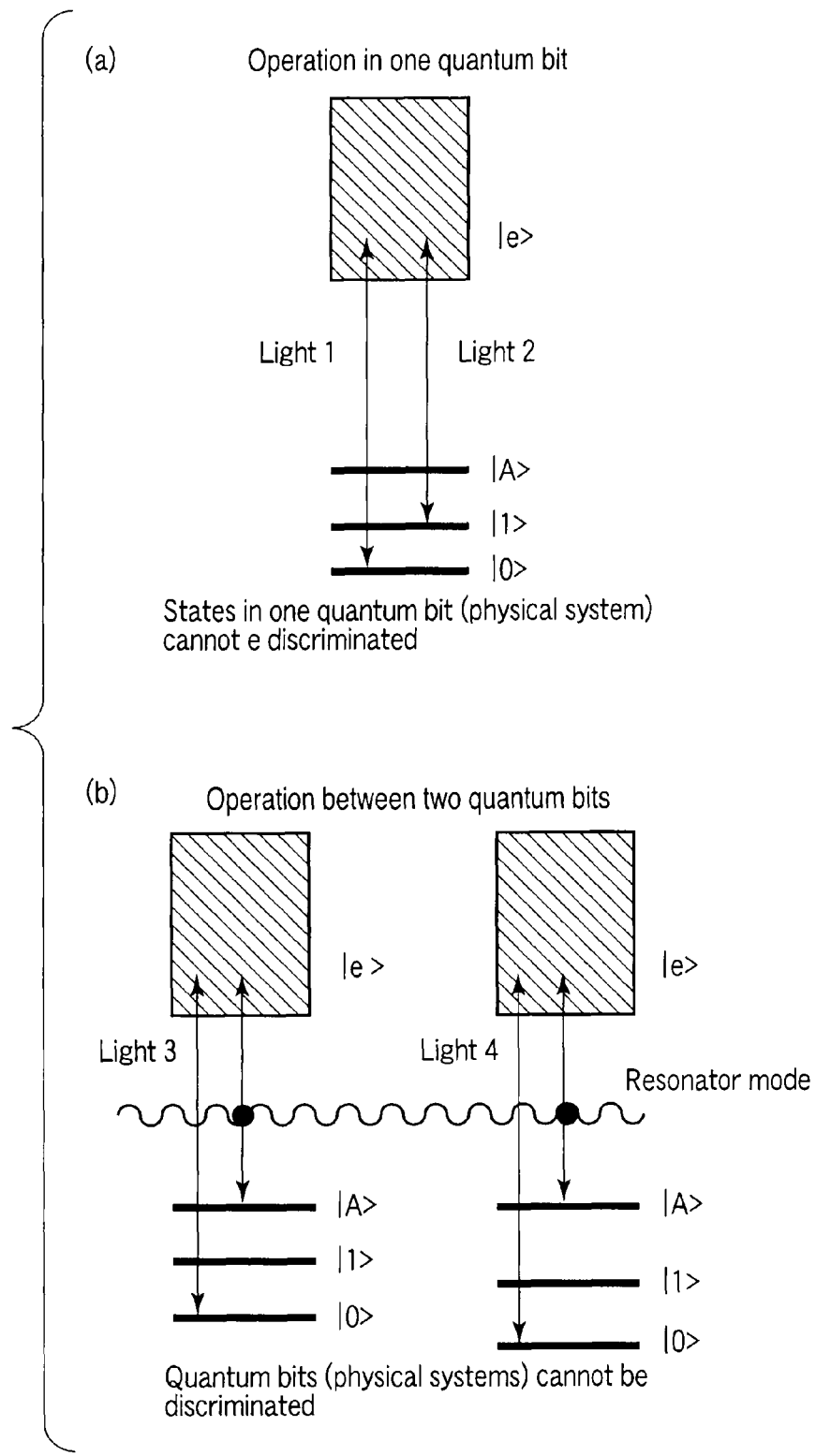
FIG. 3 is a view useful in explaining the case of using a transition of a wide homogenous broadening for operating quantum bits.

Referring then to FIG. 3, a description will be given of the case where the homogenous broadening for the transition used for operating a quantum bit is greater than the energy difference between states that normally or temporarily represent the quantum bit.

In this case, neither discrimination of states representing a quantum bit (i.e., discrimination of states resonating with the light beams 1 and 2 in FIG. 3(a), or discrimination of a state resonating with the light beam 3 or 4 in FIG. 3(b) from a state resonating with the resonator mode), nor discrimination of states representing different quantum bits (i.e., discrimination of physical systems to which the states resonating with the light beams 3 and 4 in FIG. 3(b) belong) is possible.

In point of discrimination of quantum states, it is more advantageous if the employed homogenous broadening for the transition is narrower. However, as will be described later, in view of the success probability of the quantum gate, and the time required for realizing the quantum gate, it is more advantageous if the coupling of the resonator mode with the transition used for operating a quantum bit is stronger. For this purpose, it is desirable to use a transition of a great transition dipole moment. In this desirable case, the transition will have a great homogenous broadening at least corresponding to transition probability.

The present embodiment employs a method described below for realizing, even when the energy difference between states representing a quantum bit is small, a quantum gate of high performance using a transition of a great transition dipole moment as a transition to be coupled with the resonator mode.

When using, for a gate operation between two quantum bits, a resonator mode strongly coupled with a transition of a great transition dipole moment and wide homogeneous broadening, the states |0> and |1> of a small energy difference, which represent the quantum bits, are respectively transferred to |4> and |5> of a greater energy difference than the homogenous broadening for the used transition. A description will later be given of two types of quantum gate methods to which the present embodiment is applied. In the second one of the quantum gate methods, it is sufficient if one of the states |0> and |1> is transferred to |2>, which is one of the two states of the transition that resonates with the resonator mode, and the energy difference between the remaining state (|0> or |1>) and the state |2> is set greater than the homogenous broadening for the used transition.

For instance, to transfer, to $|4>_k$, $|5>_k$ or $|2>_k$, the state $|0>_k$ or $|1>_k$ of a certain physical system k, which represents each quantum bit, adiabatic passage between the two states is utilized, in which light is applied with its frequency varied to cross the frequency that resonates with a $|0>_k$–$|4>_k$ transition, or to cross the frequency that resonates with a $|1>_k$–$|5>_k$ transition, or to cross the frequency that resonates with a $|1>_k$–$|2>_k$ transition. Alternatively, to transfer, to $|4>_k$, $|5>_k$ or $|2>_k$, the state $|0>_k$ or $|1>_k$, which represents each quantum bit, π pulse light that resonates with a $|0>_k$–$|4>_k$ transition, a $|1>_k$–$|5>_k$ transition, or a $|1>_k$–$|2>_k$ transition may be applied, thereby exchanging the two states of the transition with which the π pulse light resonates.

In these states, an operation using the resonator mode is executed. After finishing the operation using the resonator mode between the two quantum bits, the resultant state |4>, |5> or |2> is returned to |0> or |1>, or to the state representing the quantum bit before the above-mentioned transferring.

In general, the two states representing a quantum bit are selected because they have long coherence times. It is considered that if these states are transferred to other states such as |4>, |5> or |2>, decoherence (degradation of coherence) may often advance quickly during the transfer. However, in this case, a quick gate operation due to strong coupling of the resonator mode and a physical system becomes possible, and hence even the coherence time assumed only during the transfer can be regarded as sufficiently long.

There are, for example, two methods for realizing a quantum gate between two quantum bits, as described below.

Figure 4:
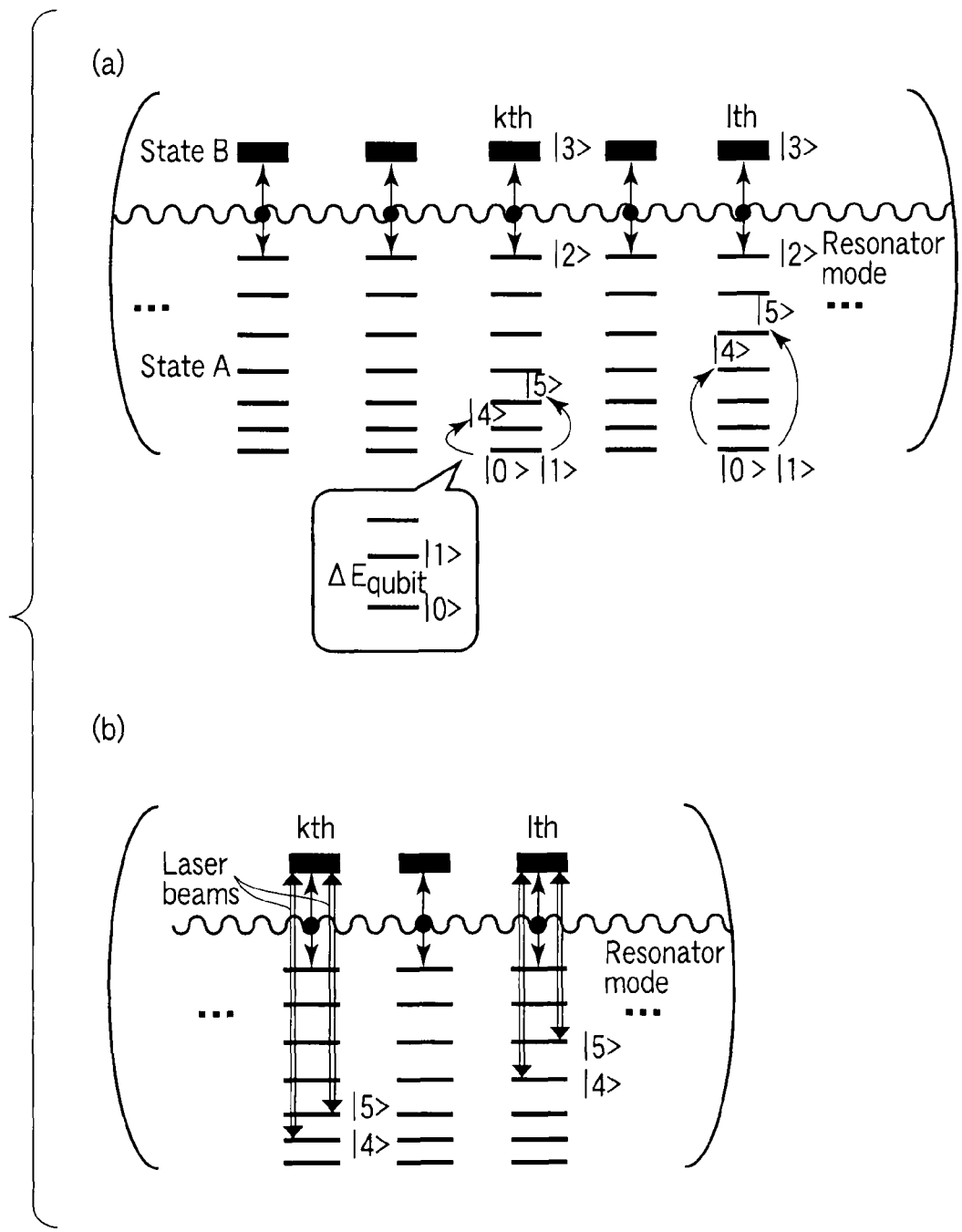
FIG. 4 is a view useful in explaining a first quantum gate method according to the embodiment.

In a first method, quantum bits coupled to each other when they resonate with a common resonator mode are operated by a conventional light beam (coherent light), thereby realizing a quantum gate between two quantum bits. This method will be described in detail with reference to FIG. 4.

This method employs a plurality of physical systems that include a plurality of states (called states A) having small transition dipole moments therebetween and each having a narrow homogeneous broadening for a transition, and also include a state (called state B) having a great transition dipole moment with respect to each state A, and a wide homogeneous broadening for a transition with respect to each state A. Two states |0> and |1>, which are included in the states A and have an energy difference $\Delta E_{qubit}$ therebetween, represent the quantum bit of a physical system that is not currently subjected to a 2-qubit gate operation. In general, the energy difference $\Delta E_{qubit}$ between the states |0> and |1> is small, and these states have long coherence times. Namely, $\Delta E_{homo} > \Delta E_{qubit}$. These physical systems are contained in an optical resonator, and a transition between one (|2>) of the states A and the state B (set at |3>) is resonant with a common resonator mode. Further, the energy difference between |2> and |3> is greater than $\Delta E_{homo}$.

To execute a 2-qubit gate operation using $k^{th}$ and $l^{th}$ quantum bits included in the quantum bits represented by the physical systems, a series of processes (1) to (3) described below are executed on $k^{th}$ and $l^{th}$ physical systems:

(1) The states |0> and |1> of each of the quantum bits are transferred to |4> and |5>, respectively. The energy difference between |4> and |5> is set greater than $\Delta E_{homo}$, and the energy difference between each of the four combinations, i.e., |4> and |2>, |4> and |3>, |5> and |2>, and |5> and |3>, is also set greater than $\Delta E_{homo}$ (as shown in FIG. 4(a)).

(2) Optical pulses that resonate with a |4>–|3> transition and a |5>–|3> transition are applied to the physical systems, thereby executing a gate operation using adiabatic passage (as shown in FIG. 4(b)).

(3) The states |4> and |5> of each of the quantum bits are transferred to |0> and |1>, respectively.

In the above process (1), when a quantum bit gate operation using the resonator mode is executed on m quantum bits represented by physical systems k (k=j(1), j(2), ..., j(m); 2≦m≦n) included in physical systems i (1≦i≦n, n: integer not less than 2), the states of the quantum bits represented by $|0>_k$ and $|1>_k$ are transferred to the states $|4>_k$ and $|5>_k$, which are two states of each physical system k, the difference in energy between the two states being greater than the homogenous broadening $\Delta E_{homo}$, the difference in energy between any one of the two states, i.e., $|4>_k$ or $|5>_k$, and any one of the states $|2>_k$ and $|3>_k$ being greater than the homogenous broadening $\Delta E_{homo}$ ($|E(|u>_k)-E(|v>_k)|>\Delta E_{homo}$, u, v∈{2, 3, 4, 5}, u≠v, E(|s>) representing the energy of a state s). Alternatively, when a quantum gate operation using the resonator mode is executed on the m quantum bits represented by the physical systems k included in the physical systems i, the states of the quantum bits represented by $|0>_k$ and $|1>_k$ are transferred to the states $|4>_k$ and $|5>_k$, which are two states of each physical system k or two states of different physical systems k, the difference in energy between the two states being greater than the homogenous broadening $\Delta E_{homo}$, the difference in energy between any one of the two states, i.e., $|4>_k$ or $|5>_k$, and any one of the states $|2>_k$ and $|3>_k$ being greater than the homogenous broadening $\Delta E_{homo}$, ($|E(|u>_g)-E(|v>_r)|>\Delta E_{homo}$, u, v∈{4, 5}, q, r∈{j(1), j(2), . . . j(m)}, q≠r).

In a second method, a 2-qubit gate operation is executed by applying a single photon to quantum bits that resonate with a common resonator mode and are thus coupled with each other.

Also in the second method, physical systems similar to those used in the first method are used, and the quantum bit of each physical system that is not currently subjected to a 2-qubit gate operation is represented by $|0>$ and $|1>$. The second method, however, uses a one-sided resonator (i.e., an optical resonator comprising a mirror of a substantially 100% reflectance, and a mirror of a reflectance lower than that) designed to cause an entered photon to be almost always returned through the same optical path as that of incident light.

In the second method, when executing a 2-qubit gate operation using the $k^{th}$ and $l^{th}$ quantum bits, a series of operations (1) to (3) as below are executed on the $k^{th}$ and $l^{th}$ physical systems.

(1) The state $|1>$ is transferred to the state $|2>$.

Figure 5:
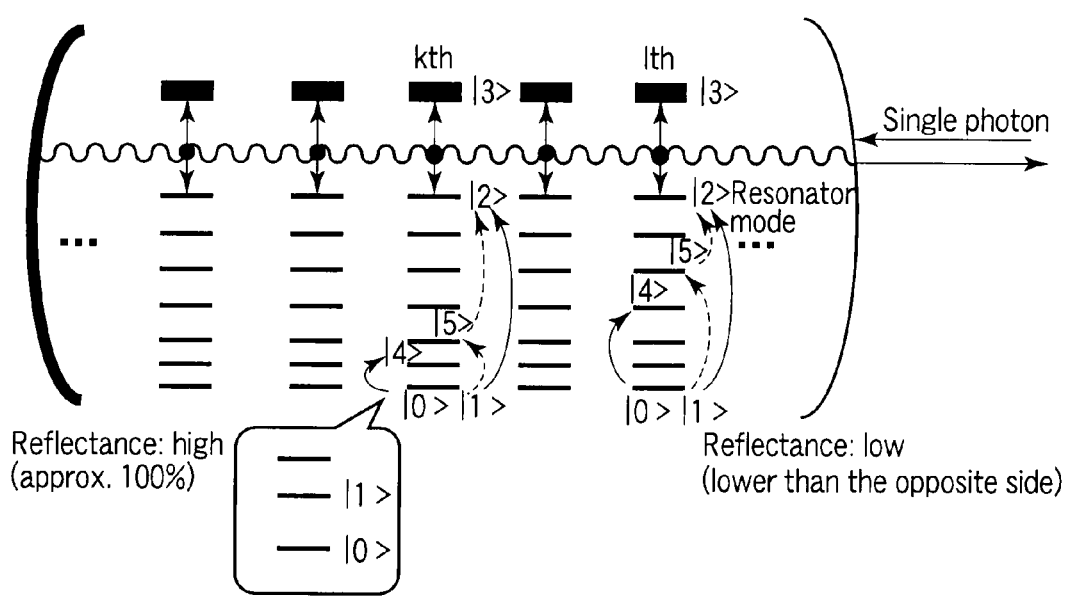
FIG. 5 is a view useful in explaining a second quantum gate method according to the embodiment.

(2) A single photon is applied through the mirror of the lower reflectance to the resonator mode that connects the quantum bits (FIG. 5). This operation is a control phase gate operation as a 2-qubit gate operation.

(3) The state $|2>$ is returned to the state $|1>$.

When selectively executing the operation (1) on the $k^{th}$ and $l^{th}$ physical systems, each physical system is once transferred to the state A that is not $|2>$ (the $k^{th}$ and $l^{th}$ physical systems are selected by selecting the frequency of light used), and then transferred to $|2>$ (as indicated by the broken lines in FIG. 5).

In the series of operations, the state $|0>$, instead of the state $|1>$, may be transferred to the state $|2>$, then a single photon be applied, and the state $|2>$ be returned to the state $|0>$.

In the first method, since strong coupling of the resonator mode and transition is utilized for adiabatic passage, high-speed gate operations are possible, thereby reducing the probability of failure in the gate operations. In the second method, since great normal-mode splitting is caused by the strong coupling of the resonator mode and transition, the probability of failure can also be reduced when comparison is made using light pulses of the same pulse width (i.e., using the same gate operation rate).

The advantage of the first method will be described in more detail. In the 2-qubit gate operation in which adiabatic passage is applied to physical systems coupled by the resonator mode, the higher the attenuation constant of the optical resonator, and the higher the relaxation rate of a transition coupled with the resonator mode, the greater the probability of errors. Assume here that the error probability P is represented by the sum of κ·T due to relaxation of the resonator, and (Γ·T)/($g^2 \cdot T^2$) due to relaxation of the transition, κ being the attenuation constant of the resonator, T being a time required for realizing a gate operation, Γ being the relaxation rate of the transition, g being the coupling constant of the resonator mode and the ions. Assuming that P is a function of T, it is set to a minimum value of $2 \cdot \{(\kappa \cdot \Gamma)/g^2\}^{1/2}$ at $T_{min}=(1/g) \cdot (\Gamma/\kappa)^{1/2}$. This value is the error probability obtained after gate time optimization. Further, assuming that rare-earth ion doped crystal in the optical resonator is used as a physical system, and an f-f transition of a narrow homogenous broadening is used as the transition coupled with the resonator mode, $T_{min}$ is approximately $2 \times 10^{-6}<1/g$ since g, κ and Γ are approximately 100 kHz, 50 kHz and 2 kHz, respectively, and hence does not satisfy the condition for adiabatic passage that a time substantially longer than the inverse value of the coupling constant is needed. As a result, excitation to an upper-level state, in which relaxation occurs, will easily occur, and hence the error probability due to the relaxation may well be increased. However, if an f-d transition of a wide homogenous broadening is used, g is, for example, approx. 100 to 1000 times the value set in the above case, which satisfies the condition for adiabatic passage. Therefore, it is expected that a minimum P can be realized. Thus, the failure probability of the quantum gate can be reduced.

According to the above-described embodiment, while the quantum gate operation using the resonator mode is being executed, each of quantum bits, which are represented by states having small energy differences and long coherence times, is temporarily represented by the two states that are assumed by each quantum bit or different quantum bits and have a great energy difference therebetween. With this structure, even if the resonator mode is used which is made to resonate with a transition that has a great transition dipole moment and has a homogenous broadening greater than the energy difference between the two states normally representing a quantum bit or between the states normally representing different quantum bits, the two states representing the quantum bit or the states representing the different quantum bits can be discriminated from each other, thereby enabling strong coupling of the resonator mode with the transition having the great transition dipole moment to be used as a quantum gate.

First Example

Figure 6:
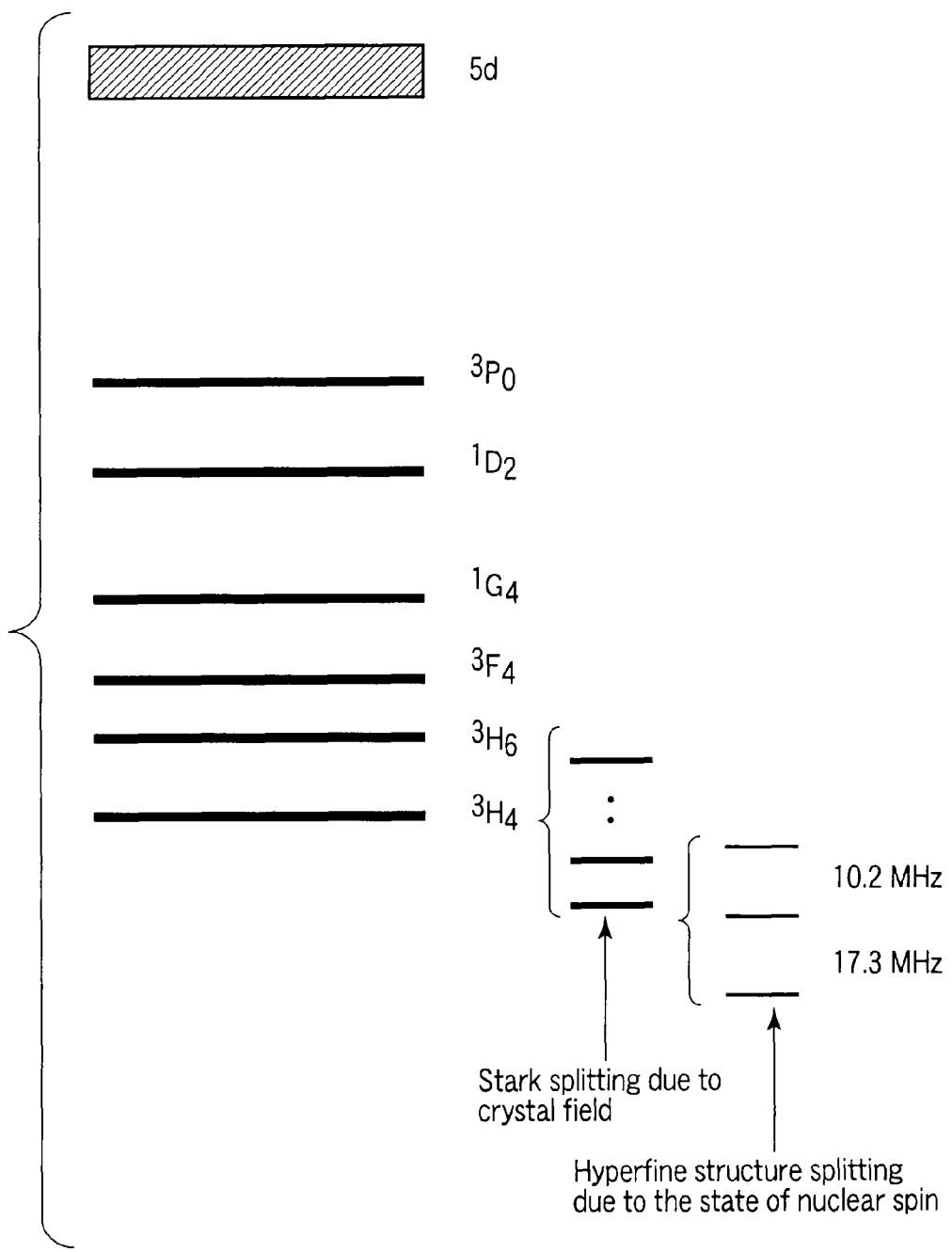
FIG. 6 is a schematic view illustrating the energy state of a $Pr^{3+}$ ion in $Y_2SiO_5$ crystal used in the embodiment.

In a quantum gate method and apparatus according to a first example, $Pr^{3+}$ ions in $Pr^{3+}:Y_2SiO_5$ crystal, in which $10^{-3}$% $Y^{3+}$ ions in $Y_2SiO_5$ crystal are replaced with $Pr^{3+}$ ions, are used as quantum bits. The crystal has a size of approx. 10 mm×10 mm×10 mm, and has a surface provided with a mirror of extra-high reflectance to thereby provide a resonator structure. The resonator mode resonates with a transition of the $^3P_0$–5d band of each $Pr^{3+}$ ion, and the mode waist radius is approx. 1 μm. The crystal is placed in the cryostat and kept at 1.5 K. The energy states included in those of each $Pr^{3+}$ ion in the $Pr^{3+}:Y_2SiO_5$ crystal and used in the first example are shown in FIG. 6.

Figure 7:
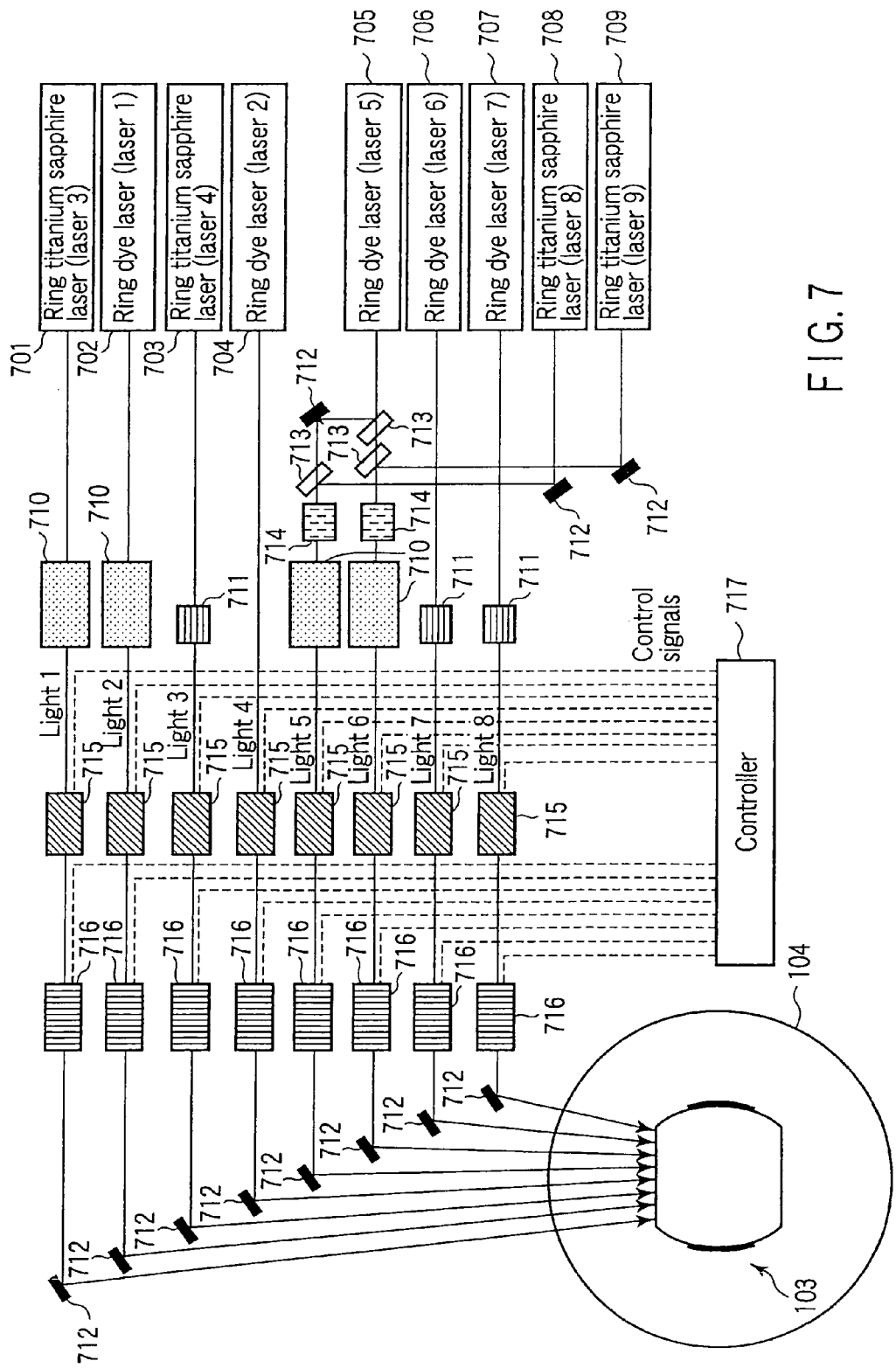
FIG. 7 is a block diagram illustrating the configuration of the quantum gate apparatus of the embodiment.

Referring now to FIG. 7, the quantum gate apparatus of the first example will be described.

The quantum gate apparatus of the first example comprises argon ion laser excitation ring titanium sapphire lasers 701, 703, 708 and 709, ring dye lasers 702, 704, 705, 706 and 707, a laser frequency narrowing system 710, double-wave non-linear crystal pieces 711, mirrors 712, beam splitters 713, difference frequency nonlinear crystal pieces 714, frequency-setting acoustooptic effect elements 715, intensity-setting acoustooptic effect elements 716, a controller 717, a resonator attached resonator 103, and a cryostat 104. The lasers 701, 703, 708, 709, 702, 704, 705, 706 and 707, the laser frequency narrowing system 710, the double-wave nonlinear crystal pieces 711, the mirrors 712, the beam splitters 713 and the difference frequency nonlinear crystal pieces 714 are incorporated in the light source unit 101. The frequency-setting acoustooptic effect elements 715, the intensity-setting acoustooptic effect elements 716, the controller 717 and mirrors 712 are incorporated in the optical control unit 102.

To operate one (ion 1) of the two ions representing two target quantum bits during a 2-qubit gate operation, two ring dye lasers (laser 1 702 and laser 2 704) for argon ion laser excitation, and two argon ion laser excitation ring titanium sapphire lasers (laser 3 701 and laser 4 703) are prepared. The spectra of the lasers 1 702 and laser 3 701 are narrowed down to 1 kHz and have their absolute frequencies stabilized by the feedback system (laser frequency narrowing system 710) formed of a reference resonator, an acoustooptic effect element and an electrooptic effect element. The light beams emitted from the laser 3 701 and laser 1 702 are set as light beams 1 and 2. Further, the light beam from the laser 4 703 is further passed through the double-wave nonlinear crystal pieces 711 to have its frequency doubled. This light beam is set as light beam 3, and the light beam from the laser 2 704 is set as light beam 4.

To operate the other ion (ion 2), yet three ring dye lasers (laser 5 705, laser 6 706 and laser 7 707) for argon ion laser excitation, and two argon ion laser excitation ring titanium sapphire lasers (laser 8 708 and laser 9 709) are prepared. The light beam emitted from the laser 5 705 is divided into two beams, one of which is converted by the nonlinear crystal 714 into a beam of a frequency equal to the difference between the frequency thereof and the frequency of a light beam from the laser 8 708. Similarly, the other light beam is converted by the other nonlinear crystal 714 into a beam of a frequency equal to the difference between the frequency thereof and the frequency of a light beam from the laser 9 709. The spectra of the resultant light beams are narrowed down to 1 kHz by the other feedback system (laser frequency narrowing system 710) formed of a reference resonator, an acoustooptic effect element and an electrooptic effect element. The thus obtained light beams are set as light beams 5 and 6. Further, the light beams from the laser 6 706 and the laser 7 707 are converted by the respective double-wave nonlinear crystal pieces 711 into double waves that are set as light beams 7 and 8, respectively.

The light beams 1 to 8 have their frequencies and intensities adjusted by the frequency-setting acoustooptic effect elements 715 and the intensity-setting acoustooptic effect elements 716 under the control of the controller 717.

Concerning the ion 1, assume that one of the transition frequencies of $^3H_4$–$^1G_4$ transitions dissolved up to the split states due to the nuclear spin is set as $v_{104}$. The lower state of the one $^3H_4$–$^1G_4$ transition (corresponding to $v_{104}$) is ±|5/2>, which is one of the three states obtained by splitting, due to the state of the nuclear spin, the state that is included in the states of $^3H_4$ resulting from Stark splitting and has the lowest energy. This state is set as |0>$_1$. Further, the upper state of the one $^3H_4$–$^1G_4$ transition is set as |4>$_1$. Similarly, assume that one of the transition frequencies of $^3H_4$–$^1D_2$ transitions dissolved up to the split states due to the nuclear spin is set as $v_{115}$. The lower state of the one $^3H_4$–$^1D_2$ transition (corresponding to $v_{115}$) is ±|3/2>, which is one of the three states obtained by splitting, due to the state of the nuclear spin, the state that is included in the states of $^3H_4$ resulting from Stark splitting and has the lowest energy. This state is set as |1>$_1$. Further, the upper state of the one $^3H_4$–$^1D_2$ transition is set as |5>$_1$.

Concerning the ion 2, assume that one of the transition frequencies of $^3H_4$–$^3H_6$ transitions dissolved up to the split states due to the nuclear spin is set as $v_{204}$. The lower state of the one $^3H_4$–$^3H_6$ transition (corresponding to $v_{204}$) is ±|5/2>, which is one of the three states obtained by splitting, due to the state of the nuclear spin, the state that is included in the states of $^3H_4$ resulting from Stark splitting and has the lowest energy. This state is set as |0>$_2$. Further, the upper state of the one $^3H_4$–$^3H_6$ transition is set as |4>$_2$. Similarly, assume that one of the transition frequencies of $^3H_4$–$^3F_4$ transitions dissolved up to the split states due to the nuclear spin is set as $v_{215}$. The lower state of the one $^3H_4$–$^3F_4$ transition (corresponding to $v_{215}$) is ±|3/2>, which is one of the three states obtained by splitting, due to the state of the nuclear spin, the state that is included in the states of $^3H_4$ resulting from Stark splitting and has the lowest energy. This state is set as |1>$_2$. Further, the upper state of the one $^3H_4$–$^3F_4$ transition is set as |5>$_2$.

The light beams 1, 2, 3, 4, 5, 6, 7 and 8 can be made to resonate with $v_{104}$, $v_{115}$, a $^1G_4$–5d band transition, a $^1D_2$–5d band transition, $v_{204}$, $v_{215}$, a $^3H_6$–5d band transition, and a $^3F_4$–5d band transition, respectively.

When executing a 2-qubit gate operation between the ions 1 and 2, the light beams 1, 2, 5 and 6 are applied to the crystal while sweeping their frequencies to cross the frequencies $v_{104}$, $v_{115}$, $v_{204}$ and $v_{215}$, respectively, whereby the states |0>$_1$, |1>$_1$, |0>$_2$ and |1>$_2$ are transferred to the states |4>$_1$, |5>$_1$, |4>$_2$ and |5>$_2$, respectively, by adiabatic passage using two states and a single light beam. At this time, the state transferring may be executed using π pulse light beams as the light beams 1, 2, 5 and 6. After that, in this example, the light beam pulses 3, 4, 7 and 8 are applied using the method described in "Phys. Rev. A 70, 012305 (2004)," thereby executing a control phase inversion gate operation between the quantum bit (quantum bit 1) represented by the ion 1, and the quantum bit (quantum bit 2) represented by the ion 2. At this time, the strong coupling of the $^3P_0$–5d transitions of the ions 1 and 2 with the resonator mode is utilized. The homogenous broadenings of the $^3P_0$–5d transition, the $^1G_4$–5d band transition to which the light pulses 3, 4, 7 and 8 are applied, the $^1D_2$–5d band transition, the $^3H_6$–5d band transition, and the $^3F_4$–5d band transition are greater than the energy difference between the states |0>$_1$ and |1>$_1$ and that between the states |0>$_2$ and |1>$_2$. However, since these states are transferred to two states having greater energy differences, i.e., |4>$_1$ and |5>$_1$, and |4>$_2$ and |5>$_2$, a quantum gate utilizing the strong coupling of a $^3P_0$–4f5d transition with the resonator mode can be realized.

After applying the light pulses 3, 4, 7 and 8, the information expressed by the states |4>$_1$, |5>$_1$, |4>$_2$ and |5>$_2$ is returned to the information expressed by the states |0>$_1$, |1>$_1$, |0>$_2$ and |1>$_2$, respectively. In this example, $^1G_4$, $^1D_2$, $^3H_6$ and $^3F_4$, to which the states |4>$_1$, |5>$_1$, |4>$_2$ and |5>$_2$ belong, each have a plurality of states resulting from Stark splitting in a crystal field, and each of these states is further split because of the state of the corresponding nuclear spin. Accordingly, in this example, after applying the four light pulses, information is stored not only as the states |4>$_1$, |5>$_1$, |4>$_2$ and |5>$_2$, but also as a plurality of states close to them in energy. Regarding, for example, the state |4>$_1$, the following expression (1) is established:

$$\sum_{i=1}^{N}\alpha_{i}|^{1}G_{4}\rangle_{i} \quad (1)$$

The information is stored in $\alpha_i$ in the above expression (1). It is necessary to collectively transfer the thus-dispersed states to $|0\rangle_1$. More specifically, regarding the state $|4\rangle_1$, the following method is employed. Since it is beforehand determined how to apply the light pulses 3, 4, 7 and 8 (only unitary transform has to be executed on the ions 1 and 2 and the resonator mode), the value of $\alpha_i$ (reciprocal proportion) is beforehand known. Firstly, an appropriate state, e.g., one of the $^1D_2$ states, is selected and set to $|a\rangle$. It is considered that if N light beams that resonate with a transition between $|^1G_4\rangle_i$ and $|a\rangle$, and a light beam that resonates with a transition between $|1\rangle_1$ and $|a\rangle$ (not shown in FIG. 7) are prepared, and a light beam that has temporal variation in intensity occurring in accordance with $\alpha_i$ is applied, dispersed probability amplitudes can be collectively transferred to $|4\rangle_1$. Similarly, it is considered that the information represented by the states $|5\rangle_1$, $|4\rangle_2$ and $|5\rangle_2$ and states close to them can be transferred to $|1\rangle_1$, $|0\rangle_2$ and $|1\rangle_2$, respectively.

In this example, the 1-qubit gate operation is executed by dividing each of the light beams 2 and 6 into three beams to thereby form light beams having frequencies of $v_{115}$, $v_{115}+17.3$ MHz, $v_{115}-10.2$ MHz, $v_{215}$, $v_{215}+17.3$ MHz, and $v_{215}-10.2$ MHz, using the acoustooptic effect elements, and then applying these light beams to the crystal, or applying thereto two π pulse beams and a single pulse beam, or executing adiabatic passage using radiation of three light beams. Further, reading of the results can be executed by transferring, to the state of $^3P_0$, the state $|0\rangle_1$ or $|1\rangle_1$ (in the case of the quantum bit 1) or the state $|0\rangle_2$ or $|1\rangle_2$ (in the case of the quantum bit 2) by adiabatic passage or π pulse application, and observing vacuum Rabi splitting (normal mode splitting of a single physical system) appearing in the resonator mode.

As described above, a 2-qubit gate operation using an f-d transition, which can increase the transition dipole moments of the quantum bits 1 and 2 represented by the states $|0\rangle_1$, $|1\rangle_1$, $|0\rangle_2$ and $|1\rangle_2$, and also increase the coupling constants of them with respect to the resonator mode, can be executed on the quantum bits 1 and 2. Further, since the ions subjected to the 2-qubit gate operation can be selected from an inhomogenous broadening for an optical transition, the number of used quantum bits can be increased.

Second Example

In a second example, only the states $|1\rangle_1$ and $|1\rangle_2$ of the ions 1 and 2 to be subjected to the 2-qubit gate operation are transferred to the states $|5\rangle_1$ and $|5\rangle_2$, respectively, instead of transferring the states $|0\rangle_1$, $|1\rangle_1$, $|0\rangle_2$ and $|1\rangle_2$ of the ions 1 and 2 to $|4\rangle_1$, $|5\rangle_1$, $|4\rangle_2$ and $|5\rangle_2$. Further, light that resonates with a $^1D_2-^3P_0$ transition is prepared by detecting a difference frequency between the laser beam emitted from the ring dye laser and the titanium sapphire laser, thereby transferring $|5\rangle_1$ to the state $^3P_0$ of the ion 1. Furthermore, $|5\rangle_2$ is transferred to the state $^3P_0$ of the ion 2 using light generated by the ring dye laser. In the second example, the method described in "Phys. Rev. A 72, 032333 (2005)" is applied to the resonator mode and physical systems in the above states. Namely, a single photon generated by a single photon source is applied to the resonator mode, thereby executing a control phase gate operation on the quantum bits 1 and 2. Lastly, using the same method as in the first example, the information stored as the states $^3P_0$ of the ions 1 and 2 is transferred to information represented by the states $|1\rangle_1$ and $|1\rangle_2$.

Also in the second example, the 1-qubit gate operation can be executed by the same method as employed in the first example. The reading of the results can also be executed by the same method as employed in the first example.

As described above, also in the second example, a 2-qubit gate operation using an f-d transition, which can increase the transition dipole moments of the quantum bits 1 and 2 represented by the states $|0\rangle_1$, $|1\rangle_1$, $|0\rangle_2$ and $|1\rangle_2$, and also increase the coupling constants of them with respect to the resonator mode, can be executed on the quantum bits 1 and 2. In addition, since the ions subjected to the 2-qubit gate operation can be selected from an inhomogenous broadening for an optical transition, the number of used quantum bits can be increased.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A quantum gate method comprising:
causing a common resonator mode to resonate with a first transition between states of $|2\rangle_i$ and $|3\rangle_i$ in regard to physical systems i ($1 \leq i \leq n$, n: integer not less than 2), the states of $|2\rangle_i$ and $|3\rangle_i$ being coupled to each other by the first transition having a homogenous broadening of $\Delta E_{homo}$ greater than an energy difference between two states of $|0\rangle_i$ and $|1\rangle_i$, an energy difference between the states of $|2\rangle_i$ and $|3\rangle_i$ being greater than the homogenous broadening of $\Delta E_{homo}$, a plurality of physical systems contained in a resonator being set as the physical systems i, quantum bits being represented by the two states of $|0\rangle_i$ and $|1\rangle_i$ of each of the physical systems i;
transferring states of m ($2 \leq m \leq n$) quantum bits represented by states of $|0\rangle_k$ and $|1\rangle_k$ to states of $|4\rangle_k$ and $|5\rangle_k$, respectively, when a quantum bit gate operation using the common resonator mode is executed between the quantum bits represented by m physical systems k ($k=j(1), j(2), \ldots, j(m)$) included in the physical systems i, the states of $|4\rangle_k$ and $|5\rangle_k$ being two states of each of the physical systems k, an energy difference between the states of $|4\rangle_k$ and $|5\rangle_k$ being greater than the homogenous broadening of $\Delta E_{homo}$, an energy difference between any one of the two states of $|4\rangle_k$ and $|5\rangle_k$ and any one of states of $|2\rangle_k$ and $|3\rangle_k$ being greater than the homogenous broadening $\Delta E_{homo}$ ($|E(|u\rangle_k)-E(|v\rangle_k)|>\Delta E_{homo}$, u, v∈{2, 3, 4, 5}, u≠v, E(|s⟩) representing energy of a state s); executing adiabatic passage between the physical systems k, using light that resonates with a second transition between states of $|3\rangle_k$ and $|4\rangle_k$ and a third transition between states of $|3\rangle_k$ and $|5\rangle_k$;
executing, between the quantum bits, a quantum bit gate operation using the common resonator mode; and
transferring, to the states of $|0\rangle_k$ and $|1\rangle_k$, the states of quantum bits represented by the states of $|4\rangle_k$ and $|5\rangle_k$, respectively.

2. The method according to claim 1, wherein the physical systems i are rare-earth ions contained in crystal, the two states of $|0\rangle_i$ and $|1\rangle_i$ are obtained by splitting an electron ground state of each of the physical systems i by hyperfine structure splitting, and one of the states of $|2\rangle_i$ and $|3\rangle_i$ coupled to each other by the first transition is a 4f electron state, and the other state is a 5d electron state.

3. The method according to claim 1, wherein to transfer, to a state of $|4>_k$, $|5>_k$ or $|2>_k$, a state of each quantum bit represented by a state of $|0>_k$ or $|1>_k$, light having a frequency thereof varied to cross a resonance frequency corresponding to a fourth transition between the states of $|0>_k$ and $|4>_k$, between the states of $|1>_k$ and $|5>_k$ or between the states of $|1>_k$ and $|2>_k$ is applied to realize adiabatic passage therebetween.

4. The method according to claim 1, wherein to transfer, to a state of $|4>_k$, $|5>_k$ or $|2>_k$, a state of each quantum bit represented by a state of $|0>_k$ or $|1>_k$, π pulse light that resonate with a fourth transition between the states of $|0>_k$ and $|4>_k$, between the states of $|1>_k$ and $|5>_k$ or between the states of $|1>_k$ and $|2>_k$ is applied to realize to exchange of the states associated with the fourth transition.

5. A quantum gate method comprising:
causing a common resonator mode to resonate with a first transition between states of $|2>_i$ and $|3>_i$ in regard to physical systems i ($1 \leq i \leq n$, n: integer not less than 2), the states of $|2>_i$ and $|3>_i$ being coupled to each other by the first transition having a homogenous broadening of $\Delta E_{homo}$ greater than an energy difference between two states of $|0>_i$ and $|1>_i$, an energy difference between the states of $|2>_i$ and $|3>_i$ being greater than the homogenous broadening of $\Delta E_{homo}$, a plurality of physical systems contained in a resonator being set as the physical systems i, quantum bits being represented by the two states of $|0>_i$ and $|1>_i$ of each of the physical systems i;
transferring states of m ($2 \leq m \leq n$) quantum bits represented by states of $|0>_k$ and $|1>_k$ to states of $|4>_k$ and $|5>_k$, respectively, when a quantum bit gate operation using the common resonator mode is executed between the quantum bits represented by m physical systems k (k=j(1), j(2), ..., j(m)) included in the physical systems i, the states of $|4>_k$ and $|5>_k$ being two states of each of the physical systems k, an energy difference between the states of $|4>_k$ and $|5>_k$ being greater than the homogenous broadening of $\Delta E_{homo}$, an energy difference between any one of the two states of $|4>_k$ and $|5>_k$ and any one of states of $|2>_k$ and $|3>_k$ being greater than the homogenous broadening $\Delta E_{homo}$, an energy difference between two states $|u>_q$ and $|v>_r$ of different ones of the physical systems k being greater than the homogenous broadening of $\Delta E_{homo}$ ($|E(|u>_q)-E(|v>_r)|>\Delta E_{homo}$, u, v∈{4, 5}, q, r∈{j(1), j(2), ..., j(m)}, q≠r);
executing adiabatic passage between the physical systems k, using light that resonates with a second transition between states of $|3>_k$ and $|4>_k$ and a third transition between states of $|3>_k$ and $|5>_k$;
executing, between the quantum bits, a quantum bit gate operation using the common resonator mode; and
transferring, to the states of $|0>_k$ and $|1>_k$, the states of quantum bits represented by the states of $|4>_k$ and $|5>_k$, respectively.

6. The method according to claim 5, wherein the physical systems i are rare-earth ions contained in crystal, the two states of $|0>_i$ and $|1>_i$ are obtained by splitting an electron ground state of each of the physical systems i by hyperfine structure splitting, and one of the states of $|2>_i$ and $|3>_i$ coupled to each other by the first transition is a 4f electron state, and the other state is a 5d electron state.

7. The method according to claim 5, wherein to transfer, to a state of $|4>_k$, $|5>_k$ or $|2>_k$, a state of each quantum bit represented by a state of $|0>_k$ or $|1>_k$, light having a frequency thereof varied to cross a resonance frequency corresponding to a fourth transition between the states of $|0>_k$ and $|4>_k$, between the states of $|1>_k$ and $|5>_k$ or between the states of $|1>_k$ and $|2>_k$ is applied to realize adiabatic passage therebetween.

8. The method according to claim 5, wherein to transfer, to a state of $|4>_k$, $|5>_k$ or $|2>_k$, a state of each quantum bit represented by a state of $|0>_k$ or $|1>_k$, π pulse light that resonate with a fourth transition between the states of $|0>_k$ and $|4>_k$, between the states of $|1>_k$ and $|5>_k$ or between the states of $|1>_k$ and $|2>_k$ is applied to realize to exchange of the states associated with the fourth transition.

9. A quantum gate method comprising:
causing a common resonator mode to resonate with a first transition between states of $|2>_i$ and $|3>_i$ in regard to physical systems i ($1 \leq i \leq n$, n: integer not less than 2), the states of $|2>_i$ and $|3>_i$ being coupled to each other by the first transition having a homogenous broadening of $\Delta E_{homo}$ greater than an energy difference between two states of $|0>_i$ and $|1>_i$, an energy difference between the states of $|2>_i$ and $|3>_i$ being greater than the homogenous broadening of $\Delta E_{homo}$, a plurality of physical systems contained in a resonator being set as the physical systems i, quantum bits being represented by the two states of $|0>_i$ and $|1>_i$ of each of the physical systems i;
transferring, to a state of $|2>_k$, one of states of $|0>_k$ and $|1>_k$ when a quantum bit gate operation using the common resonator mode is executed between m ($2 \leq m \leq n$) quantum bits represented by m physical systems k (k=j(1), j(2), ..., j(m)) included in the physical systems i, an energy difference between the state of $|2>_k$ and the one of the states of $|0>_k$ and $|1>_k$ being not greater than the homogenous broadening of $\Delta E_{homo}$, an energy difference between the state of $|2>_k$ and the other of the states of $|0>_k$ and $|1>_k$ being greater than the homogenous broadening of $\Delta E_{homo}$, the other state of $|0>_k$ and $|1>_k$ being kept unchanged, the state of $|2>_k$ and a state of $|3>_k$ being coupled with each other by the first transition, the state of $|2>_k$ being lower in energy than the state of $|3>_k$;
applying, to the resonator, a single photon that resonates with the common resonator mode to execute the quantum bit gate operation between the quantum bits; and
returning the state of $|2>_k$ to the one of the states of $|0>_k$ and $|1>_k$ after finishing the quantum bit gate operation executed between the quantum bits using the single photon and the common resonator mode.

10. The method according to claim 9, wherein the physical systems are rare-earth ions contained in crystal, the two states of $|0>_i$ and $|1>_i$ are obtained by splitting an electron ground state of each of the physical systems i by hyperfine structure splitting, and one of the states of $|2>_i$ and $|3>_i$ coupled to each other by the first transition is a 4f electron state, and the other state is a 5d electron state.

11. The method according to claim 9, wherein to transfer, to a state of $|4>_k$, $|5>_k$ or $|2>_k$, a state of each quantum bit represented by a state of $|0>_k$ or $|1>_k$, light having a frequency thereof varied to cross a resonance frequency corresponding to a fifth transition between the states of $|0>_k$ and $|4>_k$, between the states of $|1>_k$ and $|5>_k$ or between the states of $|1>_k$ and $|2>_k$ is applied to realize adiabatic passage therebetween.

12. The method according to claim 9, wherein to transfer, to a state of $|4>_k$, $|5>_k$ or $|2>_k$, a state of each quantum bit represented by a state of $|0>_k$ or $|1>_k$, π pulse light that resonate with a fourth transition between the states of $|0>_k$ and $|4>_k$, between the states of $|1>_k$ and $|5>_k$ or between the states of $|1>_k$ and $|2>_k$ is applied to realize to exchange of the states associated with the fourth transition.

13. A quantum gate apparatus comprising:
a resonator;
a plurality of physical systems i ($1 \leq i \leq n$, n: integer not less than 2) contained in the resonator, each of the physical systems i having two states of $|0\rangle_i$ and $|1\rangle_i$ that represent quantum bits, each physical system also having states of $|2\rangle_i$ and $|3\rangle_i$ coupled to each other by a first transition having a homogenous broadening of $\Delta E_{homo}$ greater than an energy difference between two states of $|0\rangle_i$ and $|1\rangle_i$, an energy difference between the states of $|2\rangle_i$ and $|3\rangle_i$ being greater than the homogenous broadening of $\Delta E_{homo}$;
a first light source which transfers states of m ($2 \leq m \leq n$) quantum bits represented by states of $|0\rangle_k$ and $|1\rangle_k$ to states of $|4\rangle_k$ and $|5\rangle_k$, respectively, when a quantum bit gate operation using a resonator mode of the resonator is executed between the quantum bits represented by m physical systems k (k=j(1), j(2), ..., j(m)) included in the physical systems i, and which transfers the states of the quantum bits represented by the states of $|4\rangle_k$ and $|5\rangle_k$ to the states of $|0\rangle_k$ and $|1\rangle_k$, respectively, when the quantum bit gate operation using the resonator mode is finished, the resonator mode being made to resonate with the first transition, the states of $|4\rangle_k$ and $|5\rangle_k$ being two states of each of the physical systems k, an energy difference between the states of $|4\rangle_k$ and $|5\rangle_k$ being greater than the homogenous broadening of $\Delta E_{homo}$, an energy difference between any one of the two states of $|4\rangle_k$ and $|5\rangle_k$ and any one of states of $|2\rangle_k$ and $|3\rangle_k$ being greater than the homogenous broadening $\Delta E_{homo}$ ($|E(|u\rangle_k)-E(|v\rangle_k)| > \Delta E_{homo}$, u, v $\in \{2, 3, 4, 5\}$, u $\neq$ v, E($|s\rangle$) representing energy of a state s);
a second light source which execute adiabatic passage between the physical systems k, using light that resonates with a second transition between a state of $|3\rangle_k$ and a state of $|4\rangle_k$ and a third transition between states of $|3\rangle_k$ and $|5\rangle_k$, the state of $|3\rangle_k$ being one of two states coupled by a fourth transition that resonates with the resonator mode; and
a control unit configured to control temporal variations in waves of light beams emitted from the first light source and the second light source.

14. A quantum gate apparatus comprising:
a resonator;
a plurality of physical systems ($1 \leq i \leq n$, n: integer not less than 2) contained in the resonator, each of the physical systems i having two states of $|0\rangle_i$ and $|1\rangle_i$ that represent quantum bits, each physical system also having states of $|2\rangle_i$ and $|3\rangle_i$ coupled to each other by a first transition having a homogenous broadening of $\Delta E_{homo}$ greater than an energy difference between two states of $|0\rangle_i$ and $|1\rangle_i$, an energy difference between the states of $|2\rangle_i$ and $|3\rangle_i$ being greater than the homogenous broadening of $\Delta E_{homo}$;
a first light source which transfers states of m ($2 \leq m \leq n$) quantum bits represented by states of $|0\rangle_k$ and $|1\rangle_k$ to states of $|4\rangle_k$ and $|5\rangle_k$, respectively, when a quantum bit gate operation using a resonator mode of the resonator is executed between the quantum bits represented by m physical systems k (k=j(1), j(2), ..., j(m)) included in the physical systems i, and which transfers the states of the quantum bits represented by the states of $|4\rangle_k$ and $|5\rangle_k$ to the states of $|0\rangle_k$ and $|1\rangle_k$, respectively, when the quantum bit gate operation using the resonator mode is finished, the resonator mode being made to resonate with the first transition, the states of $|4\rangle_k$ and $|5\rangle_k$ being two states of each of the physical systems k, an energy difference between the states of $|4\rangle_k$ and $|5\rangle_k$ being greater than the homogenous broadening of $\Delta E_{homo}$, an energy difference between any one of the two states of $|4\rangle_k$ and $|5\rangle_k$ and any one of states of $|2\rangle_k$ and $|3\rangle_k$ being greater than the homogenous broadening $\Delta E_{homo}$, an energy difference between two states $|u\rangle_q$ and $|v\rangle_r$ of different ones of the physical systems k being greater than the homogenous broadening of $\Delta E_{homo}$ ($|E(|u\rangle_q)-E(|v\rangle_r)| > \Delta E_{homo}$, u, v $\in \{4, 5\}$, q, r $\in \{j(1), j(2), ... j(m)\}$, q $\neq$ r);
a second light source configured to execute adiabatic passage between the physical systems k, using light that resonates with a second transition between a state of $|3\rangle_k$ and a state of $|4\rangle_k$ and a third transition between states of $|3\rangle_k$ and $|5\rangle_k$, the state of $|3\rangle_k$ being one of two states coupled by a fourth transition that resonates with the resonator mode; and
a control unit configured to control temporal variations in waves of light beams emitted from the first light source and the second light source.

15. A quantum gate apparatus comprising:
a resonator;
a plurality of physical systems i ($1 \leq i \leq n$, n: integer not less than 2) contained in the resonator, each of the physical systems i having two states of $|0\rangle_i$ and $|1\rangle_i$ that represent quantum bits;
a third light source which transfers, to a state of $|2\rangle_k$, one of states of $|0\rangle_k$ and $|1\rangle_k$ when a quantum bit gate operation using a resonator mode of the resonator is executed between m ($2 \leq m \leq n$) quantum bits represented by m physical systems k (k=j(1), j(2), ..., j(m)) included in the physical systems i, and which returns the state of $|2\rangle_k$ to the one of the states of $|0\rangle_k$ and $|1\rangle_k$, when a quantum bit gate operation using the resonator mode and a single photon resonating with the resonator mode is finished, an energy difference between the state of $|2\rangle_k$ and the one of the states of $|0\rangle_k$ and $|1\rangle_k$ being not greater than a homogenous broadening of $\Delta E_{homo}$, an energy difference between the state of $|2\rangle_k$ and the other of the states of $|0\rangle_k$ and $|1\rangle_k$ being greater than the homogenous broadening of $\Delta E_{homo}$, the other state of $|0\rangle_k$ and $|1\rangle_k$ being kept unchanged, the state of $|2\rangle_k$ and a state of $|3\rangle_k$ being coupled with each other by a first transition that resonates with the resonator mode, the state of $|2\rangle_k$ being lower in energy than the state of $|3\rangle_k$, the resonator mode being made to resonate with the first transition having the homogenous broadening of $\Delta E_{homo}$ that is greater than an energy difference between the two states of $|0\rangle_i$ and $|1\rangle_i$;
a fourth light source configured to apply, to the resonator, the single photon that resonates with the resonator mode to execute the quantum bit gate operation between the quantum bits; and
a control unit configured to control temporal variations in waves of light beams emitted from the third source and fourth light source.

* * * * *